(12) United States Patent
Skidmore et al.

(10) Patent No.: US 7,052,422 B2
(45) Date of Patent: May 30, 2006

(54) MOTORCYCLE CHAIN TENSION ADJUSTER

(75) Inventors: Jay F. Skidmore, Clinton Corners, NY (US); Lance P. Johnson, Millbrook, NY (US)

(73) Assignee: JSR, Inc., Clinton Corners, NY (US)

( * ) Notice: Subject to any disclaimer, the term of this patent is extended or adjusted under 35 U.S.C. 154(b) by 232 days.

(21) Appl. No.: 10/633,106

(22) Filed: Aug. 1, 2003

(65) Prior Publication Data

US 2005/0026731 A1 Feb. 3, 2005

(51) Int. Cl.
*F16H 7/10* (2006.01)
(52) U.S. Cl. ...................... 474/116; 474/136
(58) Field of Classification Search ............... 474/116, 474/101, 136, 138, 117
See application file for complete search history.

(56) References Cited

U.S. PATENT DOCUMENTS

| | | | |
|---|---|---|---|
| 628,082 A * | 7/1899 | Ennis et al. ............. 474/116 |
| 1,995,794 A * | 3/1935 | Clark ...................... 280/286 |
| 4,061,050 A | 12/1977 | Bolger | |
| 4,237,744 A | 12/1980 | Jolly | |
| 4,616,729 A | 10/1986 | Kasai | |
| 5,049,114 A | 9/1991 | Hayden | |
| 5,240,087 A | 8/1993 | Parker | |
| 5,337,849 A | 8/1994 | Eavenson, Sr. et al. | |
| 5,524,725 A | 6/1996 | Schantzen | |
| 5,888,159 A * | 3/1999 | Liao ........................ 474/116 |
| 5,964,312 A | 10/1999 | Maldonado | |
| 6,450,282 B1 | 9/2002 | Gogo et al. | |

FOREIGN PATENT DOCUMENTS

| | | | |
|---|---|---|---|
| FR | 534125 | * 3/1922 | ............. 474/116 |
| GB | 9230 | * 1/1896 | ............. 474/116 |
| GB | 8412 | * 7/1896 | ............. 474/116 |
| GB | 21419 | * 4/1898 | ............. 474/116 |

\* cited by examiner

*Primary Examiner*—Marcus Charles
(74) *Attorney, Agent, or Firm*—BK Patento, Inc.; Billy J Knowles

(57) ABSTRACT

A tension adjusting device is attached to an axle member of a driven wheel of a vehicle and is coupled to a forked frame member to adjust tension of a chain. The tension adjusting device has two tension adjusters joined to each side of the axle member that engages a guide recess of the forks of the frame member and support the axle fastener to secure the axle member to the two adjustment plates. The two adjustment plates include extending members that each extend over an end of each fork. An adjustment bore is drilled through the extending member and aligned with the ends of the forks. An adjustment stud is affixed through the adjustment bores to make contact with the end of the forks and to allow the axle member of the driven wheel to move in an adjustment slot to adjust the tension of the chain.

25 Claims, 5 Drawing Sheets

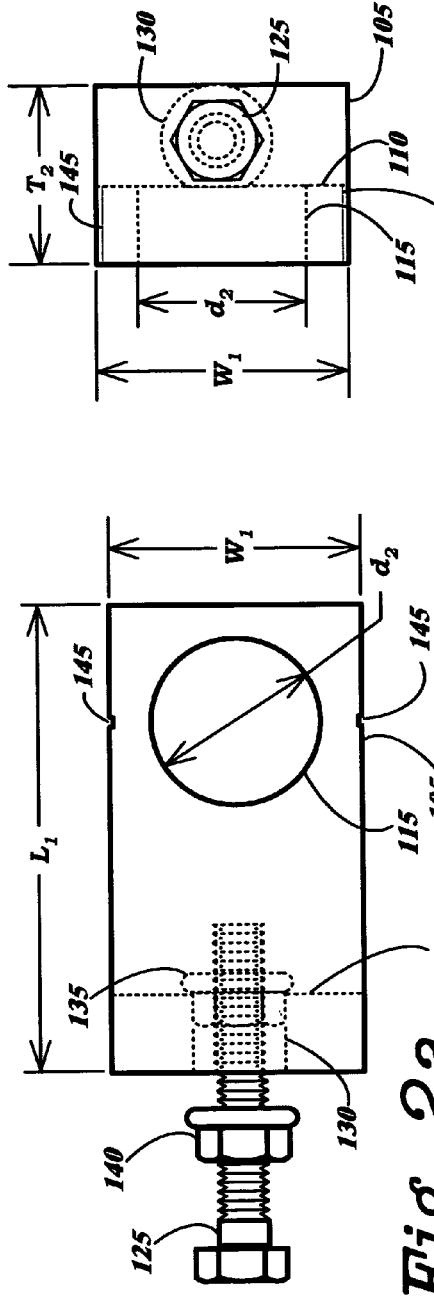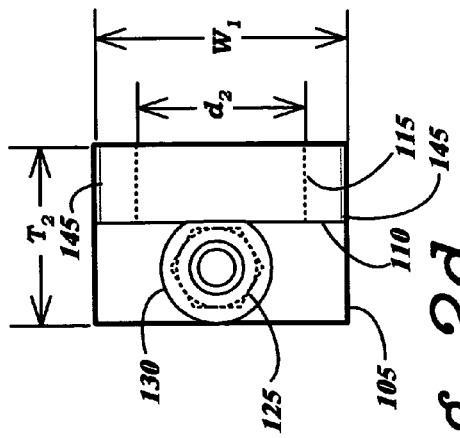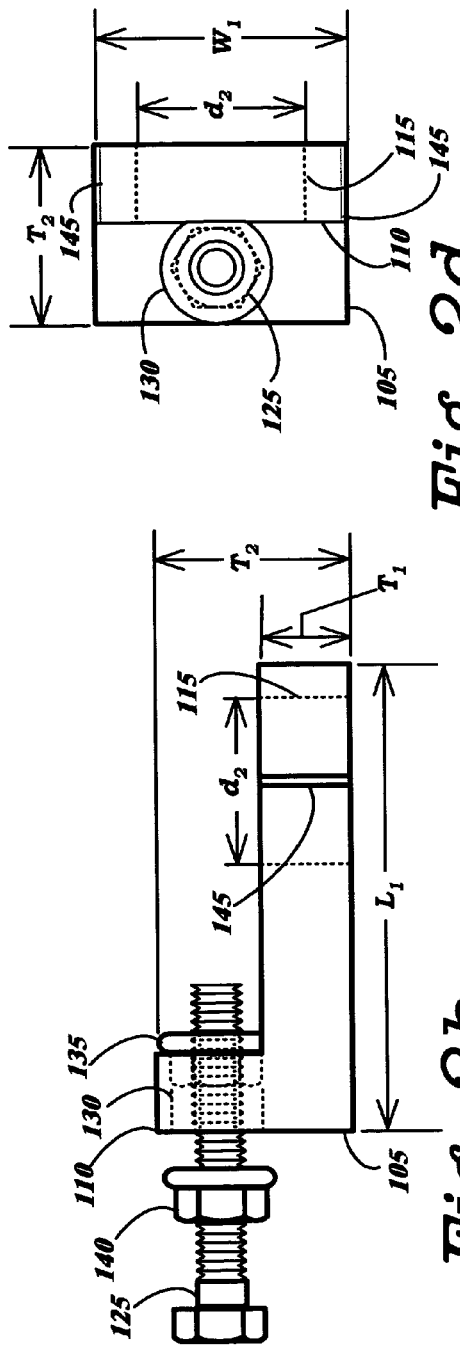

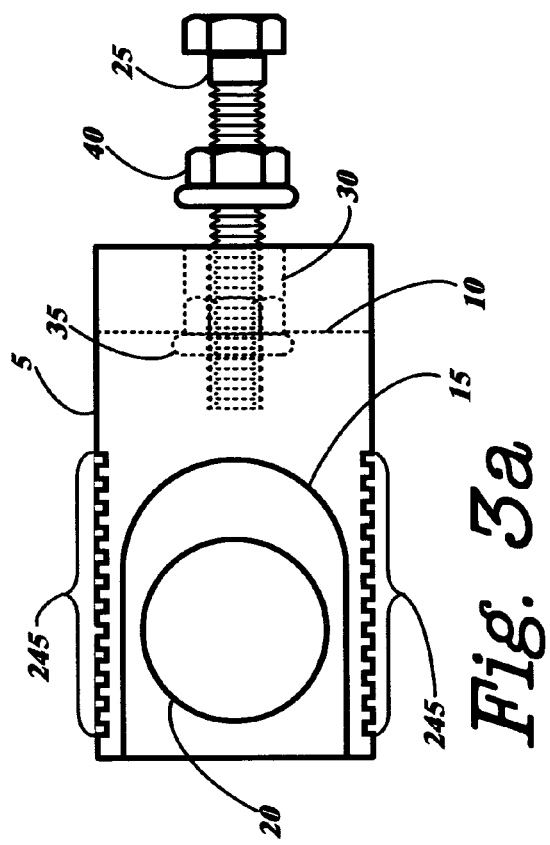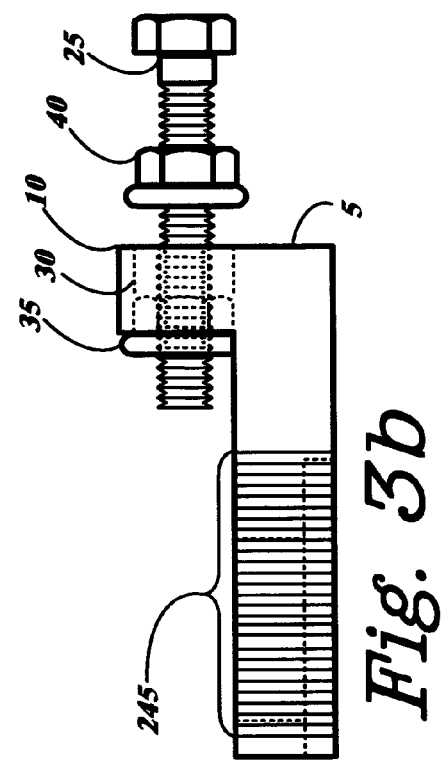

MOTORCYCLE CHAIN TENSION ADJUSTER

BACKGROUND OF THE INVENTION

1. Field of the Invention

This invention relates generally to wheeled vehicles with a flexible power transmission mechanism such as a chain or belt. More particularly, this invention relates to devices for the adjustment of tension in a flexible power transmission mechanism.

2. Description of Related Art

Wheeled vehicles such as motorcycles generally have a drive sprocket or pulley attached to the drive shaft of the motor. The drive sprocket or pulley is then coupled to a flexible power transmission mechanism. In the case of the drive sprocket, the flexible power transmission mechanism is a chain.

Alternately, in the case of the drive pulley, the flexible power transmission mechanism is a belt. The chain or belt is then coupled to a sprocket or pulley affixed to driven wheel. The driven wheel is mounted to an axle that is secured to the frame of the motorcycle. Generally the frame of the motorcycle has a forked swing arm. The axle is secured to the swing arm. The swing arm allows vertical movement of the driven wheel. This vertical movement is dampened by a shock absorbing system connecting the swing arm and a rigid portion of the frame.

As is known in the art, the chain or belt must have correct tension to efficiently transfer power from the motor to the driven wheel. Motorcycles such as those manufactured by Yamaha Motor Corporation, USA, Kawasaki Motors Corp. U.S.A., American Suzuki Motor Corporation, Ducati Motor Holding S.p.A., and other motor cycle manufacturers integrate a chain tensioner or puller with the driven wheel of their motor cycles. The chain tensioner is coupled to the forks of the swing arm and is placed in a recessed axle slot of the forks. The chain tensioner is attached to the axle of the driven wheel.

In many of the current models of motorcycle, the chain tensioner is placed forward of the driven axle. The chain tensioner pushes the axle within an axle bore that is opened within the recessed guide of the forks. The chain tensioner is often adjusted by rotating a threaded stud captivated in a housing placed in the recess guide and secured to the forks. The threaded stud generally has a hexagonal head that is adjusted with a standard wrench. For motorcycles involved in "off-road" touring or racing, the chain tensioner often becomes fouled with mud and debris. This makes the adjustment difficult. Further, the size of the hexagonal head of the threaded stud is normally small and it is difficult to perform the adjustment during a race or in an "off-road" environment.

U.S. Pat. No. 6,450,282 (Gogo, et al.) describes a swing-arm support structure for a motorcycle. The swing-arm illustrated shows a slide adjuster mechanism for adjusting the tension of a chain of a motorcycle.

U.S. Pat. No. 5,524,725 (Schantzen) illustrates a chain drive that has an automatic chain tension adjustor.

U.S. Pat. No. 5,337,849 (Eavenson Sr., et al.) details a mechanism for mounting an axle to a vehicle. An adjustable tensioning mechanism includes a bolt and nut for shifting the second axle housing with respect to the first axle housing to thereby adjust the tension in the chain.

U.S. Pat. No. 5,049,114 (Hayden) describes a self-adjusting chain tensioning device made up of a spring loaded rubbing block that is in continuous contact with the chain.

U.S. Pat. No. 4,616,729 (Kasai) details a transmission chain adjuster for motorcycles. An arrangement is provided for adjusting the tension in each of two chains and one of these adjusting mechanisms moves the pivot point of the trailing arm relative to the frame.

U.S. Pat. No. 4,237,744 (Jolly) describes a chain tension adjusting device using a cam mounted within a sleeve that moves a driven wheel axle on a fork frame.

U.S. Pat. No. 4,061,050 (Bolger) illustrates a compensating mechanism to provide constant tension between a driving sprocket and a driven sprocket of a motorcycle.

U.S. Pat. No. 5,240,087 (Parker) describes a one-sided rear swing arm suspension system for a motorcycle with a chain-driven rear wheel. The tension of the drive chain may be adjusted without affecting the ride height of the motorcycle by an adjustment yoke that moves the axle longitudinally on the swing arm by means of an adjustment stud extending from the swing arm, and a corresponding adjustment nut entrapped in the neck of the yoke.

U.S. Pat. No. 5,964,312 (Maldonado) has a combination suspension swing arm and light assembly also serving to cover the axle nuts and axle adjustment screws for a motorcycle. The lenses are removable to expose both axle nuts and axle adjustment screws, permitting the full adjustment of both.

SUMMARY OF THE INVENTION

An object of this invention is to provide a tension adjusting device that adjusts the tension of a flexible power transmission mechanism for wheeled vehicles such as motorcycles.

Another object of this invention is to provide a tension adjusting device that replaces the original equipment tension adjusting device that has been attached to an axle member of a driven wheel of a vehicle and coupled to a forked frame member to adjust tension of a flexible power transmission mechanism that transfers power from a drive shaft of the wheeled vehicle to the driven wheel.

To accomplish at least one of these objects, a tension adjusting device has a first tension adjuster joined to a first side of the axle member and a second tension adjuster joined to a second side of the axle member. The first tension adjuster includes a first adjustment plate. The first adjustment plate has a first dimension to slidably engage a guide recess of a first fork of the forked frame member and a second dimension sufficient to support a first axle fastener to the axle member to the first adjustment plate. The first adjustment plate further includes an extending member that extends over an end of the first fork. An axle bore is drilled through the first adjustment plate such that the first side of the axle member may pass through the first adjustment plate. The first side of the axle member receives the first axle fastener to secure the axle member to the first adjustment plate and couple the first adjustment plate to the first fork of the forked frame member. A capturing recess is let into the first adjustment plate to secure the first axle fastener to prevent movement of the first axle fastener during the coupling of the driven wheel. The first adjustment plate has an adjustment bore drilled through the extending member and aligned with the end of the first fork. A first adjustment stud is affixed through the adjustment bore to the first adjustment plate such that the adjustment stud is in contact with the end of the first fork to allow the axle member of the driven wheel to move in an adjustment slot within the guide recess to adjust the tension of the power transmission mechanism.

The second tension adjuster has a second adjustment plate with a first dimension to slidably engage a guide recess of a second fork of the forked frame member and a second dimension sufficient to support a second axle fastener to the axle member to the second adjustment plate. The second adjustment plate further includes an extending member that extends over an end of the second fork. An axle bore is drilled through the second adjustment plate such that the second side of the axle member may pass through the second adjustment plate. The second side of the axle member receives the second axle fastener to secure the axle member to the second adjustment plate and couple the second adjustment plate to the second fork of the forked frame member. The second adjustment plate has an adjustment bore drilled through the extending member and aligned with the end of the second fork. A second adjustment stud is affixed through the adjustment bore to the second adjustment plate such that the adjustment stud is in contact with the end of the second fork to allow the axle member of the driven wheel to move in an adjustment slot within the guide recess to adjust the tension of the power transmission mechanism.

The adjustment bores of the first and second adjustment plates may be threaded. Alternately, each adjustment bore may have a captivating nut secured to the first and second adjustment plates within the adjustment bores to accept the first adjustment stud. The first and second adjustment studs may be threaded and each includes a securing nut. The securing nut locks the first and second adjustment studs respectively to the first and second adjustment plates, when the first and second adjusting studs have moved the driven wheel such that the flexible power transmission mechanism has the final tension.

The first and second adjustment plates each include at least one guide marking placed to insure that the axle member is oriented with respect to the forked frame member. In tensioning the flexible power transmission mechanism, one of the adjustment studs is rotated to move the axle member within the adjustment slot of the forks of the forked frame member. When the flexible power transmission mechanism is at the final tension, the location of the guide marking is noted and the other adjusting stud is rotated to move the axle member to align with guide marking.

In the preferred embodiment of this invention, the flexible power transmission mechanism is a chain and the chain is engaged with teeth of a sprocket coupled to the driven wheel. However, in an alternate embodiment of this invention, the flexible power transmission mechanism is a belt and the belt is placed on a pulley coupled to the driven wheel.

The first and second adjustment plates are formed of an aircraft grade aluminum. Conversely the materials for the first and second adjustment plates may be steel, titanium, or carbon epoxy.

An original equipment tension adjusting device is replaced by removing the original equipment tension adjusting device from the forked frame member and the axle member. The replacement tension adjusting device is installed on axle member. The driven wheel with the replacement tension adjusting device is placed between the first and second fork of the forked frame member. The flexible power transmission mechanism is coupled to the driven wheel. The placement of the driven wheel is modified such that the extending members of the first and second adjustment plates are aligned respectively with the ends of first and second ends of the forked frame member and the flexible power transmission mechanism has a preliminary tension. The first and second adjustment studs are varied to move the driven wheel incrementally to adjust the flexible power transmission mechanism to the final tension.

BRIEF DESCRIPTION OF THE DRAWINGS

FIGS. 2a–2d are respectively front, top and two side plan views of second tension adjuster of the tension adjusting device of this invention.

FIGS. 3a–3b are respectively front and top plan views of the first tension adjuster of the tension adjusting device of this invention illustrating multiple guide marks.

DETAILED DESCRIPTION OF THE INVENTION

To make the adjustment of the chain tension of a motorcycle easier than is provided by chain tensioners currently employed, the chain tensioning device of this invention replaces the original equipment chain tensioners. The chain tension device of this invention has two chain tension adjusters that are joined to the axle of the driven wheel of the motorcycle and coupled to it through an adjustment slot within a recessed guide of the forks of the swing arm frame member of the motorcycle. The tension adjusting device permits the adjustment of the chain tension with standard wrenches or sockets and allows for more rapid changes of sprocket gearing. Further, the tension adjusting device pulls the axle rather than pushing the axle as in standard chain tensioners in current usage. Additionally, the tension adjusting device of this invention permits replacement of the chain tensioner in current usage that has stripped threads in the swing arm frame member to which the chain tensioner is secured. The tension adjusting device of this invention is not secured to the swing arm frame member by the threaded bore thus making rethreading of stripped threads unnecessary.

Figure 1A:
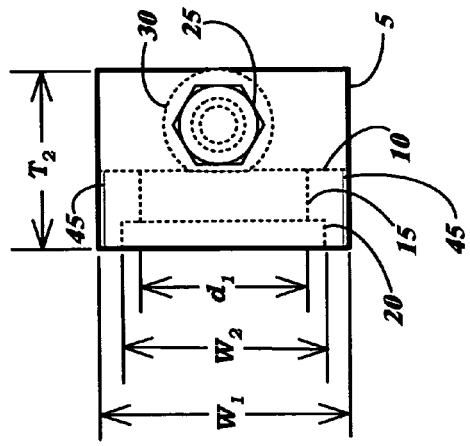
FIGS. 1a–1c are respectively the front, top and side plan views of the first tension adjuster of the tension adjusting device of this invention.
Figure 1B:
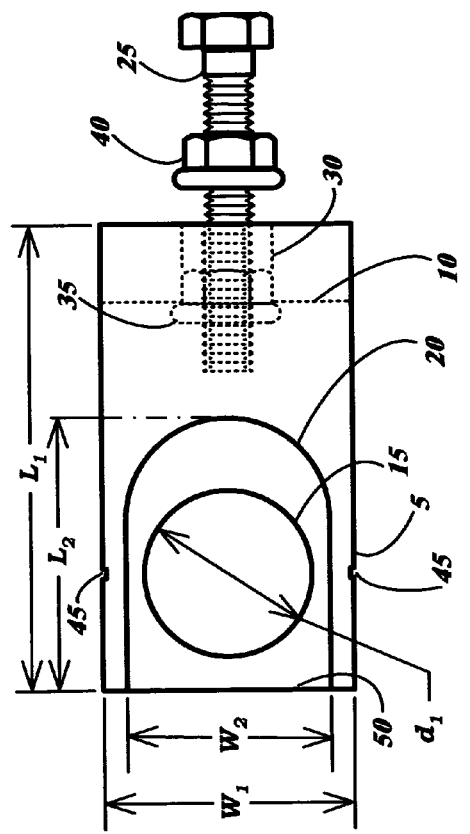
Figure 1C:
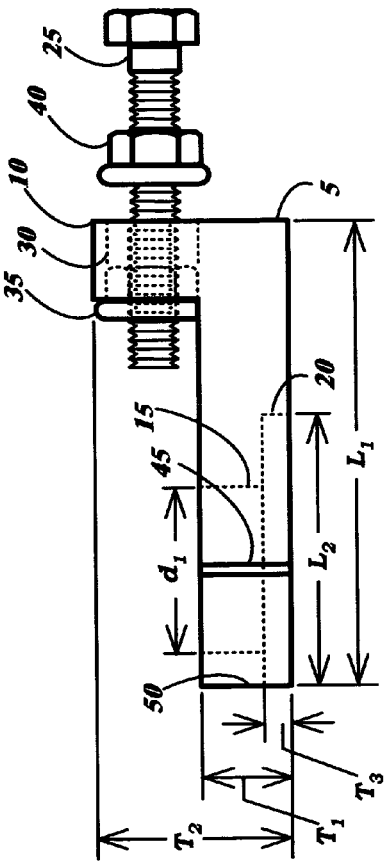

Refer now to FIGS. 1a–1c for a detailed description of the first chain tensioner of the chain tension adjusting device of this invention. The first chain tensioner has an adjustment plate 5 with an extending member 10 formed at right angles to the adjustment plate 5. The length $L_1$ of the adjustment plate is sufficient to fit in the recessed guide of one fork of the swing arm frame member of the motorcycle and thus permits the extending member 10 to over lap the end of the one fork of the swing arm frame member. In the preferred embodiment, the length $L_1$ of the adjustment plate 5 is approximately 3.000".

The width $W_1$ of the adjustment plate 5 is sufficiently wide so that the adjustment plate 5 firmly fits the width of the recessed guide of the one fork. In the preferred embodiment the width $W_1$ is from approximately 1.50" to approximately 1.60". The extending member 10 has a sufficient height $T_2$ to allow the extending member 10 to overlap the width of the one fork of the sing arm frame member. In the preferred embodiment, the height $T_2$ is from approximately 1.050" to approximately 1.125".

The axle of the driven wheel of the motorcycle is normally smooth for most of its length with only a small threaded region to accept an axle nut for securing the driven wheel to the swing arm frame member. The thickness $T_1$ of the adjustment plate 5 is designed to be adequately thick to prevent the axle nut from being turned to the bottom of the threaded region. Further, the thickness $T_1$ is designed to allow the axle nut to just cover the threaded region of the axle and not leave any of the threads of the threaded region of the axle extended beyond the axle nut. This prevents mud and debris from accumulating in the threaded region. In the preferred embodiment, the thickness $T_1$ is approximately 0.50".

An axle bore 15 is drilled into the adjustment plate 5. The axle bore 15 is centered on the width dimension $W_1$ of the adjustment plate 5 and is placed at a distance from a leading edge 50 of the adjustment plate 5 such that the axle of the driven wheel is essentially centered within the recessed guide of the one fork of the swing arm frame member while the leading edge is in contact with a forward edge of the recessed guide. The diameter $d_1$ of the axle bore is sufficiently large to accommodate the diameter of the axle. In the preferred embodiment the diameter $d_1$ of the axle bore 15 is from approximately 0.875" to approximately 1.070".

A capturing recess 20 is let into the adjustment plate 5 and is centered on the width dimension $W_1$ of the adjustment plate 5. The width $W_2$ of the capturing recess is determined by the size of the axle nut. In the preferred embodiment the capturing recess has a width of approximately 1.3". The Capturing recess 20 is used to hold the axle nut threaded on one end of the axle from turning when a second axle nut is threaded on a second end of the axle. The length $L_2$ of the capturing recess is set to allow the axle nut to fit within the capturing recess. In the preferred embodiment, the length $L_2$ is approximately 1.750". The depth $T_3$ of the capturing recess 20 is sufficient to hold the one axle nut, but not too deep to have an impact on the strength of the adjustment plate 5. In the preferred embodiment of the capturing recess 20, the depth $T_3$ is approximately 0.175".

An adjustment bore 30 is drilled in the extended member to accept an adjustment stud 25. The adjustment stud 25 is centered on the width dimension $W_1$ of the adjustment plate 5 and essentially centered in the height dimension of the extended member. This location must be set such that the adjustment stud 25 can contact the end of the fork of the swing arm frame member. The adjustment bore 30 has a diameter that can accommodate a captivated nut 35. Alternately, if the adjustment bore is to be threaded, the adjustment bore 30 must be the diameter of the adjustment stud 25. In the preferred embodiment, the adjustment stud is approximately 8 mm in diameter. If the captivated nut 35 is employed, the adjustment bore is approximately 0.50" in diameter or of a sufficient diameter to permit a press fit of the captivated nut 35.

A securing lock nut 40 is threaded on to the adjustment stud 25. When the driven wheel is coupled to the forks of the swing arm frame member, the securing lock nut 40 is unthreaded on the adjustment stud 25. The driven wheel is placed between the forks of the swing arm frame member and set to tension the chain to a preliminary tension. The axle nuts are tightened to hold the placement of the driven wheel. The adjustment stud 25 is then adjusted to move the driven wheel to adjust the chain to a final level. The securing lock nut 40 is threaded to impinge upon the extending member 10 of the adjustment plate 5 and lock the adjustment stud 25 in place.

The guide marks 45 are placed on the top and bottom surfaces of the adjustment plate 5 and are aligned with the center of the axle bore 15. The fork of the swing arm frame member will have multiple marks or a similar calibration marking to allow of the axle of the driven wheel to be correctly aligned during the movement to tension the chain. The guide marks 45 are shown at the top and bottom of the adjustment plate 5 but may also be on the front face of the adjustment plate 5.

FIGS. 2a–2d provide a detailed description of the second chain tensioner of the chain tension adjusting device of this invention. The second chain tensioner has an adjustment plate 105 with an extending member 110 formed at right angles to the adjustment plate 105. The length $L_1$ of the adjustment plate is sufficient to fit in the recessed guide of one fork of the swing arm frame member of the motorcycle and permits the extending member 110 to over lap the end of the one fork of the swing arm frame member. In the preferred embodiment, the length $L_1$ of the adjustment plate 105 is approximately 3.125".

The width $W_1$ of the adjustment plate 105 is sufficiently wide to allow for the adjustment plate 105 to firmly fit the width of the recessed guide of the one fork. In the preferred embodiment, the width $W_1$ is from approximately 1.50" to approximately 1.60". The extending member 110 has a height $T_2$ that is sufficient to allow the extending member 110 to overlap the width of the one fork of the swing arm frame member. In the preferred embodiment, the height $T_2$ is from approximately 1.050" to approximately 1.125".

The axle of the driven wheel of the motorcycle is normally smooth for most of its length with only a small threaded region to accept an axle nut for securing the driven wheel to the swing arm frame member. The thickness $T_1$ of the adjustment plate 105 is designed to be adequately thick to prevent the axle nut from being turned to the bottom of the threaded region. Further, the thickness $T_1$ is designed to allow the axle nut to just cover the threaded region of the axle and not leave any of the threads of the threaded region of the axle extended beyond the axle nut. This prevents mud and debris from accumulating in the threaded region. In the preferred embodiment, the thickness $T_1$ is approximately 0.50".

An axle bore 115 is drilled into the adjustment plate 105. The axle bore 115 is centered on the width dimension $W_1$ of the adjustment plate 105 and is placed at a distance from a leading edge 150 of the adjustment plate 105 such that the axle of the driven wheel is essentially centered within the recessed guide of the one fork of the swing arm frame member while the leading edge is in contact with a forward edge of the recessed guide. The diameter $d_1$ of the axle bore is sufficiently large to accommodate the diameter of the axle. In the preferred embodiment, the diameter $d_2$ of the axle bore 115 is from approximately 0.875" to approximately 1.070".

There is no capturing recess let in the into the adjustment plate 105. The axle nut 315 is free to be rotated with a wrench in order to tighten the axle 325 to the swing arm frame member 300 of the motorcycle.

An adjustment bore 130 is drilled in the extended member to accept an adjustment stud 125. The adjustment stud is centered on the width dimension $W_1$ of the adjustment plate 105 and essentially centered in the height dimension of the extended member. This location must be set such that the adjustment stud 125 can contact the end of the fork of the swing arm frame member. The adjustment bore 130 has a diameter that can accommodate a captivated nut 135. Alternately, if the adjustment bore is to be threaded, the adjustment bore 130 must be the diameter of the adjustment stud 125. In the preferred embodiment, the adjustment stud 125 is approximately 8mm in diameter. If the captivated nut 135 is employed, the adjustment bore is approximately 0.50" in diameter or of a sufficient diameter to permit a press fit of the captivated nut 135.

A securing lock nut 140 is threaded on to the adjustment stud 125. When the driven wheel is coupled to the forks of the swing arm frame member, the securing lock nut 140 is unthreaded on the adjustment stud 125. When the driven wheel is placed between the forks of the swing arm frame member and set to tension the chain to a preliminary tension, the axle nuts are tightened to hold the placement of the driven wheel. The adjustment stud 125 is then adjusted to align axle the driven wheel within the swing arm frame member. The securing lock nut 140 is threaded to impinge upon the extending member 110 of the adjustment plate 105 and lock the adjustment stud 125 in place.

The guide marks 145 are placed on the top and bottom surfaces of the adjustment plate 105 and are aligned with the center of the axle bore 115. The fork of the swing arm frame member will have multiple marks or a similar calibration mark to allow the axle of the driven wheel to be correctly aligned during the movement to tension the chain. The guide marks 145 are shown at the top and bottom of the adjustment plate 105 but may also be on the front face of the adjustment plate 105.

The guide marks 45 (FIGS. 1a–1c) and 145 (FIGS. 2a–2d) are shown as single guide marks with multiple calibration marks being present on the fork of the swing arm frame member. FIGS. 3a and 3b illustrate the first chain tensioner of FIGS. 1a–1c with multiple guide marks 245. In this instance, the forks of the swing arm frame member have single calibration reference marks for assisting in the aligning of the axle within the swing arm frame member.

Figure 4:
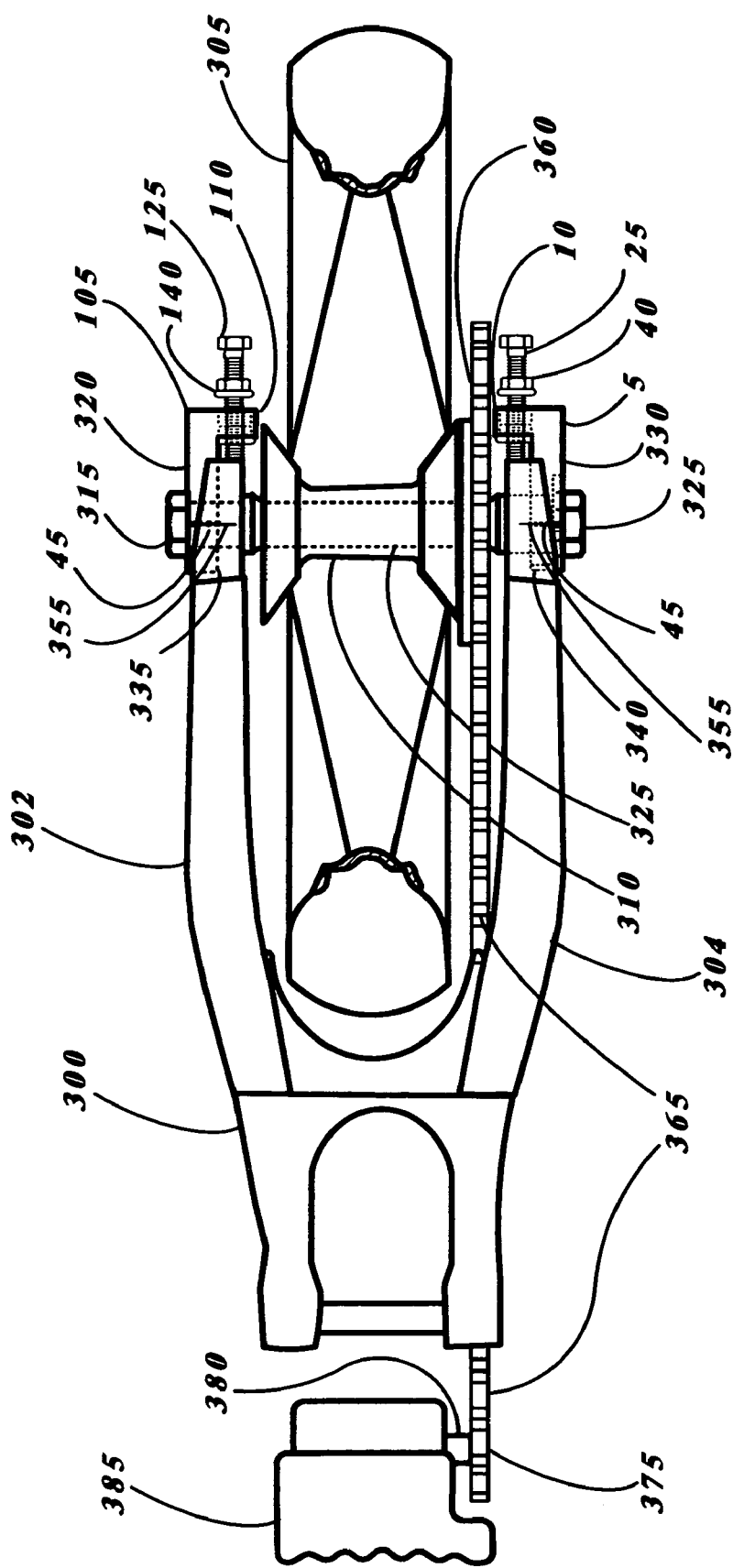
FIG. 4 is a partial top view of a motorcycle illustrating a swing arm with the driven wheel showing the placement of the tension adjusting device of this invention.
Figure 5:
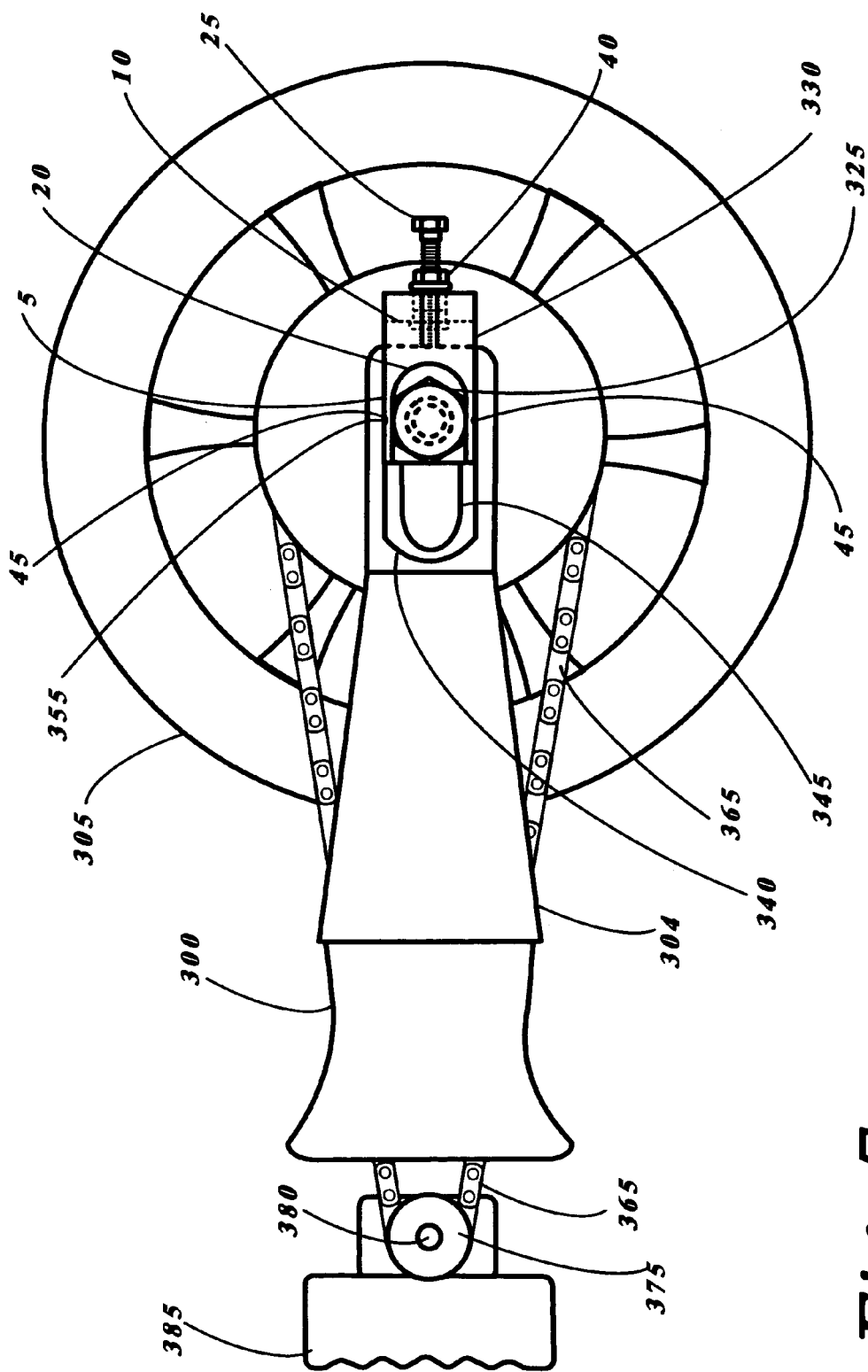
FIG. 5 is a partial side view of a motorcycle illustrating a swing arm with the driven wheel showing the placement of the tension adjusting device of this invention.

Refer now to FIGS. 4 and 5 for a discussion of the placement, installation, and operation of the chain tension adjusting device of this invention. As described above, a motorcycle has a drive sprocket 375 attached to the drive shaft 380 of the motor 385. The drive sprocket is then coupled to a flexible chain 365 that acts as a flexible transmission mechanism. The driven wheel 305 has an axle 325 that is placed between the forks 302 and 304 of the swing arm frame member 300 of the motorcycle. The chain 365 is placed on a sprocket 360. The ends of the wheel hub 310 are placed in an axle slot of 345 in each fork 302 and 304 of the swing arm frame member 300. The first chain tensioner 330 is placed on the end of the wheel hub 310 and in the guide recess 340 of one fork 304 of the swing arm frame member 300. Similarly the second chain tensioner 320 is placed on the end of the wheel hub 310 and in the guide recess of the second fork 302 of the swing arm frame member. The driven wheel 305 is moved until the chain has a preliminary tension. The first adjustment plate 5 is moved within the guide recess 340 until the extending member is aligned with the end of the fork 304. The adjustment securing nut 40 is rotated to allow the first adjustment stud 25 to be rotated such that it is in contact with the end of the fork 304. Similarly, the second adjustment plate 105 is moved within the guide recess (equivalent to the guide recess 340 of fork 304) until the extending member is aligned with the end of the fork 302. The adjustment securing nut 140 is rotated to allow the first adjustment stud 125 to be rotated such that it is in contact with the end of the fork 302.

The axle 325 is secured within the capturing recess 20 (FIGS. 1a–1c) and the axle nut 315 is tightened to secure the driven wheel 305 between the forks 302 and 304 of the swing arm frame member 300. The adjustment stud 25 is then rotated to pull the wheel hub 310 and thus increase tension on the chain 365 until a final tension is achieved. The placement of the guide mark 45 relative to a calibration reference mark 355 on the fork 304 is noted. The adjustment stud 125 is then rotated to pull the end of the wheel hub 310 until the reference mark 145 is aligned with the calibration reference mark 355 of the fork 302. The securing nuts 40 and 140 are rotated until they have respectively impinged upon the extending members 10 and 110 thus securing the adjustment studs 25 and 125 from movement during operation of the motorcycle.

The first and second adjustment plates 5 and 105, in the preferred embodiment, are formed of an aircraft grade aluminum. Conversely, the materials for the first and second adjustment plates 5 and 105 may be steel, titanium, carbon epoxy or other suitable material that can withstand the conditions of operation at the axle 325 of a motorcycle and the tension of the chain 365.

In the preferred embodiment of this invention as described, the flexible power transmission mechanism is a chain 365. The chain 365 is engaged with the teeth of a sprocket 360 coupled to the driven wheel 305. However, in an alternate embodiment of this invention, the flexible power transmission mechanism is a belt and the belt is placed on a pulley coupled to the driven wheel.

While this invention has been particularly shown and described with reference to the preferred embodiments thereof, it will be understood by those skilled in the art that various changes in form and details may be made without departing from the spirit and scope of the invention.

The invention claimed is:

1. A tension adjusting device attached to an axle member of a driven wheel of a vehicle and coupled to a forked frame member for adjusting a tension of a flexible power transmission means that transfers power from a drive shaft of said vehicle to said driven wheel, said tension adjusting device comprising:
a first tension adjuster joined to a first side of said axle member, said first tension adjuster comprising:
a first adjustment plate having a first dimension to slidably engage a guide recess of a first fork of said forked frame member and a second dimension sufficient to support a first axle fastener to said axle member to said first adjustment plate, said first adjustment plate including:
an extending member that extends over an end of said first fork,
an axle bore through which said first side of said axle member passes to receive the first axle fastener to secure said axle member to said first adjustment plate and couple said first adjustment plate to said first fork of said forked frame member, and
a capturing recess inlet into said first adjustment plate to secure first axle fastener to prevent movement of said first axle fastener during the coupling of the driven wheel, and
an adjustment bore through said extending member, said adjuster bore aligned with said end of said first fork, and
a first adjustment stud affixed through said adjustment bore to said first adjustment plate such that said adjustment stud is in contact with the end of said first fork to allow the axle member of the driven wheel to move in an adjustment slot within said guide recess to adjust the tension of the power transmission means;
a second tension adjuster joined to a second side of said axle member, said second tension adjuster comprising:

a second adjustment plate having a first dimension to slidably engage a guide recess of a second fork of said forked frame member and a second dimension sufficient to support a second axle fastener to said axle member to said second adjustment plate, said second adjustment plate including:
an extending member that extends over an end of said second fork,
an axle bore through which said second side of said axle member passes to receive the second axle fastener to secure said axle member to said second adjustment plate and couple said second adjustment plate to said second fork of said forked frame member, and
an adjustment bore through said extending member, said adjuster bore aligned with said end of said second fork, and
a second adjustment stud affixed through said adjustment bore to said second adjustment plate such that said adjustment stud is in contact with the end of said second fork to allow the axle member of the driven wheel to move in an adjustment slot within said guide recess to adjust the tension of the power transmission means.

2. The tension adjusting device of claim 1 wherein said tension adjusting device is used to replace an original equipment tension adjusting device integrated within said forked frame member and placed forward of the axle member within said guide recesses of the first and second forks.

3. The tension adjusting device of claim 1 wherein the first and second adjustment plates are formed of materials selected from the group of materials consisting of steel, aluminum, titanium and carbon epoxy.

4. The tension adjusting device of claim 1 wherein the first tension adjuster further comprises a captivating nut secured to the first adjustment plate within said adjustment bore to accept said first adjustment stud.

5. The tension adjusting device of claim 1 wherein the second tension adjuster further comprises a captivating nut secured to the second adjustment plate within said adjustment bore to accept said second adjustment stud.

6. The tension adjusting device of claim 1 wherein the first and second adjustment studs are threaded and include a securing nut which, when said first and second adjusting studs have moved said driven wheel such that said flexible power transmission means has a correct tension, said securing nut for the first and second adjustment studs are placed to lock said first and second adjustment studs respectively to the first and second adjustment plates.

7. The tension adjusting device of claim 1 wherein the first and second adjustment plates each include at least one guide marking placed to insure that the axle member is oriented with respect to said forked frame member.

8. The tension adjusting device of claim 1 wherein the flexible power transmission means is selected from the group of transmission means consisting of a chain engaged with teeth of a sprocket coupled to said driven wheel and a belt placed on a pulley coupled to said driven wheel.

9. A tension adjusting device attached to an axle member of a driven wheel of a vehicle and coupled to a forked frame member for adjusting tension of a flexible power transmission means that transfers power from a drive shaft of said vehicle to said driven wheel, said tension adjusting device comprising:
a tension adjuster joined to one side of said axle member, said first tension adjuster comprising:
an adjustment plate with a first dimension to slidably engage a guide recess of a fork of said forked frame member and a second dimension sufficient to support an axle fastener to said axle member to said adjustment plate, said adjustment plate including:
an extending member that extends over an end of said fork,
an axle bore through which said side of said axle member passes to receive the axle fastener to secure said axle member to said first adjustment plate and couple said fork adjustment plate to said first fork of said forked frame member, and
an adjustment bore through said extending member, said adjuster bore aligned with said end of said fork, and
an adjustment stud affixed through said adjustment bore to said adjustment plate such that said adjustment stud is in contact with the end of said fork to allow the axle member of the driven wheel to move in an adjustment slot within said guide recess to adjust the tension of the power transmission means.

10. The tension adjusting device of claim 9 wherein the adjustment plate further comprises:
a capturing recess inlet into said adjustment plate that secures said axle fastener to prevent movement of said axle fastener during the coupling of the driven wheel.

11. The tension adjusting device of claim 9 wherein said tension adjusting device is used to replace an original equipment tension adjusting device integrated within said forked frame member and placed forward of the axle member within said guide recesses of the first and second forks.

12. The tension adjusting device of claim 9 wherein the adjustment plates is formed of material selected from the group of materials consisting of steel, aluminum, titanium and carbon epoxy.

13. The tension adjusting device of claim 9 wherein the tension adjuster further comprises a captivating nut secured to the adjustment plate within said adjustment bore to accept said first adjustment stud.

14. The tension adjusting device of claim 9 wherein the adjustment stud is threaded and includes a securing nut which, when said adjusting stud has moved said driven wheel such that said flexible power transmission means has a correct tension, said securing nut for the adjustment stud is placed to lock said adjustment stud to the adjustment plate.

15. The tension adjusting device of claim 9 wherein the adjustment plate include at least one guide marking placed to insure that the axle member is oriented with respect to said forked frame member.

16. The tension adjusting device of claim 9 wherein the flexible power transmission means is selected from the group of power transmission means consisting of a chain engaged with teeth of a sprocket coupled to said driven wheel and a belt placed on a pulley coupled to said driven wheel.

17. A method for adjusting tension of a flexible power transmission means that transfers power from a drive shaft of a vehicle to a, said method comprising the steps of:
providing a tension adjusting device, said tension adjusting device comprising:
a first tension adjuster joined to a first side of an axle member, said first tension adjuster comprising:
a first adjustment plate having a first dimension to slidably engage a guide recess of a first fork of an forked frame member and a second dimension sufficient to support a first axle fastener to said axle member to said first adjustment plate, said first adjustment plate including:
an extending member that extends over an end of said first fork,
an axle bore through which said first side of said axle member passes to receive the first axle fastener to secure said axle member to said first adjustment plate and couple said first adjustment plate to said first fork of said forked frame member,
a capturing recess inlet into said first adjustment plate to secure a first axle fastener to prevent movement of said first axle fastener during the coupling of the driven wheel, and
an adjustment bore through said extending member, said adjuster bore aligned with said end of said first fork, and
a first adjustment stud affixed through said adjustment bore to said first adjustment plate such that said adjustment stud is in contact with the end of said first fork to allow the axle member of the driven wheel to move in an adjustment slot within said guide recess to adjust the tension of the power transmission means;
a second tension adjuster joined to a second side of said axle member, said second tension adjuster comprising:
a second adjustment plate having a first dimension to slidably engage a guide recess of a second fork of said forked frame member and a second dimension sufficient to support a second axle fastener to said axle member to said second adjustment plate, said second adjustment plate including:
an extending member that extends over an end of said second fork,
an axle bore through which said second side of said axle member passes to receive the second axle fastener to secure said axle member to said second adjustment plate and couple said second adjustment plate to said second fork of said forked frame member, and
an adjustment bore through said extending member, said adjustment bore aligned with said end of said second fork, and
a second adjustment stud affixed through said adjustment bore to said second adjustment plate such that said adjustment stud is in contact with the end of said second fork to allow the axle member of the driven wheel to move in an adjustment slot within said guide recess to adjust the tension of the power transmission means;
installing said tension adjusting device on said axle member;
placing said driven wheel with said tension adjusting device between the first and second fork of said forked frame member;
coupling said flexible power transmission means to said driven wheel;
modifying placement of said driven wheel such that the extending members of the first and second adjustment plates are aligned respectively with the ends of first and second ends of the forked frame member;
modifying placement of said driven wheel to adjust the flexible power transmission means to a preliminary tension; and
varying the first and second adjustment studs to move said driven wheel incrementally to adjust the flexible power transmission means to a final tension.

18. The method of claim 17 wherein the first and second adjustment plates are formed of materials selected from the group of materials consisting of steel, aluminum, titanium and carbon epoxy.

19. The method of claim 17 wherein the first tension adjuster further comprises a captivating nut secured to the first adjustment plate within said adjustment bore to accept said first adjustment stud.

20. The method of claim 17 wherein the second tension adjuster further comprises a captivating nut secured to the second adjustment plate within said adjustment bore to accept said second adjustment stud.

21. The method of claim 17 wherein the first and second adjustment studs are threaded and include a securing nut.

22. The method of claim 21 further comprising the step of adjusting said securing nuts for locking said first and second adjustment studs respectively to the first and second adjustment plates, when said first and second adjusting studs have moved said driven wheel such that said flexible power transmission means has the final tension.

23. The method of claim 17 further comprising the step of providing guide markings on the first and second adjustment plates for alignment with calibration marks of said forked frame member to insure that the axle member is correctly oriented with respect to said forked frame member.

24. The method of claim 23 wherein varying the first and second adjustment studs to move said driven wheel incrementally comprises the steps of:
selectively adjusting one of the first and second adjustment studs to move said driven wheel such that the flexible power transmission means is at the final tension;
noting location of the axle member within the forked frame member by location of said guide markings; and
adjusting the other of the first and second adjustment studs to move said axle member to align with said guide markings.

25. The method of claim 17 wherein the flexible power transmission means is selected from the group of power transmission means consisting of a chain engaged with teeth of a sprocket coupled to said driven wheel and a belt placed on a pulley coupled to said driven wheel.

* * * * *

UNITED STATES PATENT AND TRADEMARK OFFICE
CERTIFICATE OF CORRECTION

PATENT NO. : 7,052,422 B2  Page 1 of 1
APPLICATION NO. : 10/633106
DATED : May 30, 2006
INVENTOR(S) : Jay F. Skidmore and Lance P. Johnson It is certified that error appears in the above-identified patent and that said Letters Patent is hereby corrected as shown below:

Title Page; item (73);

Replace Assignee: JSR, Inc. (Clinton Corners, NY) with SJR, Inc. (Clinton Corners, NY)

Signed and Sealed this

Fifteenth Day of April, 2008

JON W. DUDAS
*Director of the United States Patent and Trademark Office*